Figure 1:
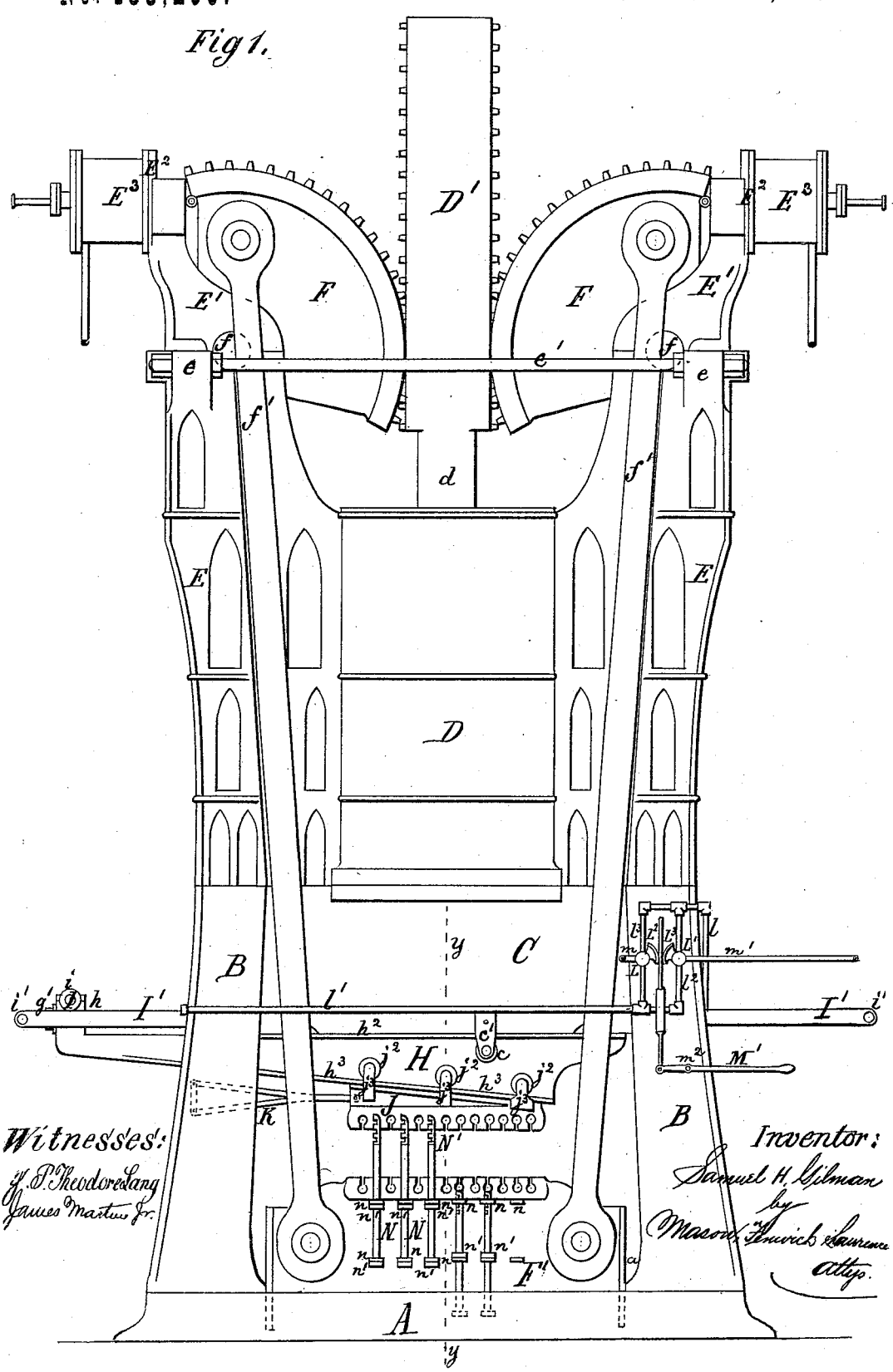

S. H. GILMAN.
COTTON-PRESS.

No. 188,290. Patented March 13, 1877.

Witnesses:
H. P. Theodore Lang
James Martin Jr.

Inventor:
Samuel H. Gilman
by
Mason, Fenwick & Lawrence
Attys.

2 Sheets—Sheet 2.
S. H. GILMAN.
COTTON-PRESS.
No. 188,290. Patented March 13, 1877.
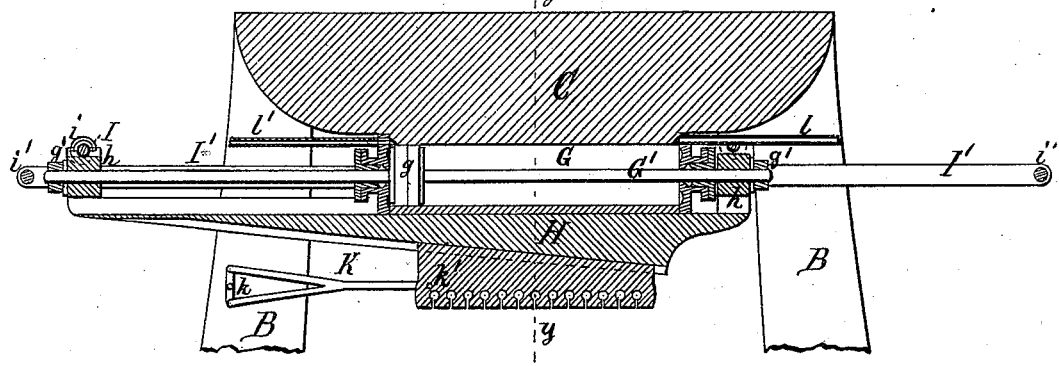
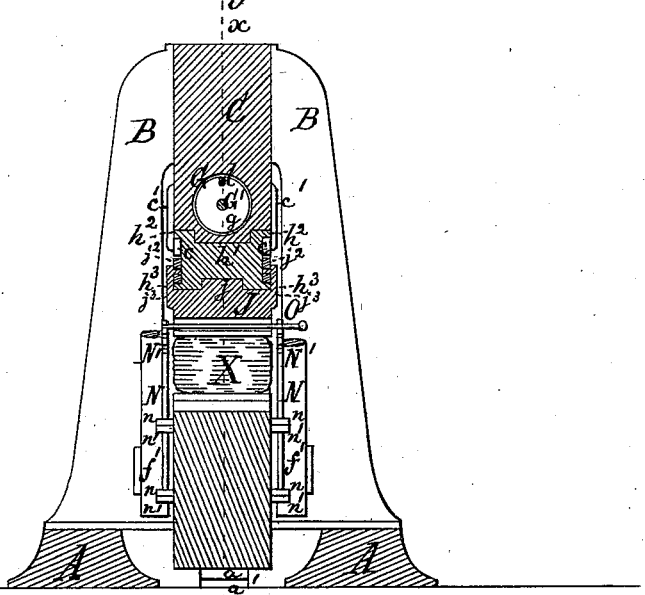
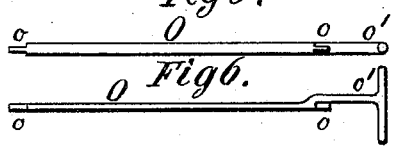
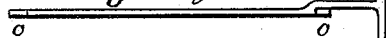
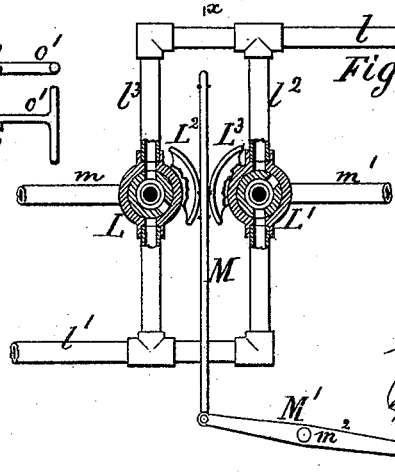
Witnesses:
J. P. Theodore Lang
James Martin Jr.
Inventor:
Samuel H. Gilman
by
Mason, Fenwick & Lawrence

UNITED STATES PATENT OFFICE.

SAMUEL H. GILMAN, OF NEW ORLEANS, LOUISIANA.

IMPROVEMENT IN COTTON-PRESSES.

Specification forming part of Letters Patent No. 188,290, dated March 13, 1877; application filed February 12, 1877.

*To all whom it may concern:*

Be it known that I, SAMUEL H. GILMAN, of New Orleans, in the parish of Orleans and State of Louisiana, have invented certain new and useful Improvements in Cotton-Presses; and I do hereby declare that the following is a full, clear, and exact description thereof, reference being had to the accompanying drawings, making part of this specification, in which—

Figure 1 is a front elevation of my improved cotton-press. Fig. 2 is a vertical longitudinal section through the upper platen, graduating wedge, and other parts contiguous thereto, in the direction the line $x\,x$ in Fig. 3 indicates. Fig. 3 is a vertical cross-section through the upper and lower platens and other contiguous parts of my improved cotton-press; line $y\,y$, Fig. 1, indicates the direction in which the section is taken. Fig. 4 is a view of a proposed valve-gear, for operating by hydraulic power the graduating wedge. Fig. 5 is an elevation of one of the series of rods used for retaining the first cotton-bale in a compressed condition upon the lower platen until the second bale is compressed upon it. Fig. 6 is a top view of the same.

The nature of my invention consists in certain constructions, combinations, and arrangements of parts hereinafter fully described and specifically claimed, whereby a steam cotton-press is produced in which twin cotton-bales are pressed and tied with a great saving of baling material, time, and labor, and whereby the graduating wedge is operated by power instead of by hand, and whereby an improved supporting-frame is provided.

My invention is especially adapted to an improved cotton-press of my invention, for which I received a patent May 30, 1876, No. 178,139.

In the drawings, A represents a strong foundation-plate, to which the legs B of a beam, C, are fastened. The beam C supports a steam-cylinder, D, and the thereto-attached frame E. A piston-rod, $d$, with a double toothed rack, D', attached to it, serves to operate two toothed sectors, F, which have their fulcrums at $f$ in the frame E. Near the said fulcrums $f$ the frame E is provided with lugs $e$, which are connected by horizontal rods $e'$, for the purpose of strengthening the frame laterally. Two extensions, $E^1$, above the frame E serve as caps for the fulcrum-pins $f$, and as supports for reversing-cylinders, as indicated at $E^3$, and also as abutments for the upper ends of the sectors F. The outer upper face $E^2$ of these extensions $E^1$ correspond in form to the flanged end of said cylinders. The construction of the said reversing-cylinders $E^3$ is the same as that in my patent above mentioned, and needs no special description.

The sectors F are provided with lifting-rods $f'$, whereby the lower platen F' is suspended and operated. Vertical guide-plates $a$ at either end of the platen F', fitted into and sliding in suitable guide-grooves $a'$ in the plate A, insure an easy and central motion of the said platen.

The beam C is provided with a horizontal longitudinal cylinder, G, below the steam-cylinder D, and in a central position with the same. The said cylinder G contains a piston, $g$, on a piston-rod, G', which latter extends through both ends of the cylinder, and by means of screw-threads and nuts $g'$ is fastened to lugs $h$ upon ends of a wedge, H. The said lugs $h$ are provided with horizontal cross-rods I, to the ends of which rollers $i$ are fitted, which travel upon parallel rails I'. These rails are attached to each side of the beam C, and are, by preference, arranged in pairs, one pair at each end, the free ends of each such pair being united by a cross-rod, $i'$. The lugs $h$ have a very small allowance of play between the rails I'—sufficient to insure easy motion.

The wedge H bears against the lower surface of the beam C, and may there be provided with a groove-and-tongue fit, as seen at $h^1$ in Fig. 3, to insure straight linear movement. The upper sides of the wedge H are provided with straight flanges $h^2$ which ride upon rollers $c$ suspended from the beam C by means of lugs $c^1$, and thereby support the wedge at or near the center of its gravity. To the lower and inclined side of the wedge H the upper platen J of the press is fitted by means of a groove-and-tongue fit, as seen at $j$ in Fig. 3. The lower inclined side of the wedge H is provided with a similarly-inclined straight flange, $h^3$, upon which a number of rollers, $j^2$, travel, the said rollers being attached, by means of lugs $j^3$, to the upper platen J, and thus forming the means of its support. The platen J is prevented from leaving its central position by being connected, with the legs B, through two connecting-rods, K, which are pivoted at $k$ to the said legs, and at $k'$ to the said platen.

The piston $g$ is propelled by water-power; and I have shown one of the many contrivances I propose to use as valve-gear for that purpose. The cylinder G has two communicating pipes, $l$ $l^1$, one at each end, which pipes are united by means of two parallel cross-pipes, $l^2$ $l^3$. These cross-pipes $l^2$ $l^3$ are at or near their centers provided with two-way cocks L $L^1$, which have sectors $L^2$ $L^3$ instead of handles, and the small ends of these cocks are open and provided with pipes $m$ $m^1$, $m$ being the inlet and $m^1$ the outlet pipe. The sectors $L^2$ $L^3$ are operated by a rod, M, between them, either by friction, or chains, or toothed gearing. The rod M is connected to the short arm of a hand-lever, M', which is pivoted at $m^2$ to one of the legs B. The openings in the plug and shell of the cocks L $L^1$ are so arranged that the supply and exhaust communication with the pipes $l$ $l^1$ are entirely cut off (with water in the cylinder) when their sectors are in central position, and that the communication between the pipes $l$ and $m$, and between the pipes $l^1$ and $m^1$ is established when the said sectors are turned up, and vice versa. Thus it is seen the stroke of the piston $g$ is reversed, and the wedge H caused to move either to the right or left, as the case may be. The lower platen F' is provided with two horizontal rows of perforated lugs, $n$, at either side below the binding-channels and precisely opposite the said channels. Through the perforations of the lugs $n$ vertical rods N are passed, which are provided with collars $n'$ and with rack-heads N'. When the first cotton-bale is pressed the said rods N are raised until their collars $n'$ bear against the lower surfaces of the lugs $n$, in which case the rack-heads N are exactly opposite the corresponding channels of the upper platen.

Instead of binding or tying the first bale X in the usual manner, steel rods O are introduced in the channels and hooked into the rack-heads N', as seen in Fig. 3. The said steel rods O are provided with reductions $o$ at each end, which fit the openings of the rack-heads N', and one end of each such rod is provided with a cross-handle, $o'$, whereby it is operated.

Operation: The first cotton-bale is pressed in the manner stated in my former patent of May 30, 1876. After the platen F' has arrived at its highest elevation the rods O are inserted into the respective channels of the platen J. The rods N are elevated and connected with the rods O by interlocking their reductions $o$ with the rack-heads N', as above described. The press is now reversed, thereby lowering the platen F' with the first cotton-bale upon it in its compressed state, the pressure being retained by the rods N and O.

The second cotton-bale is now placed upon the first cotton-bale, and then compressed. The two cotton-bales are then tied together with one set of bands, the rods O are disengaged from the rack-heads N', and pulled from between the twin bale, whereupon the twin bale is removed from the press.

The wedge H is used to facilitate the compressing of bales of varying thickness, and the water inclosed between the close cocks L L' and the piston $g$ prevents the piston from being moved accidentally during the operation of pressing the bales.

The ordinary mode of making twin bales is to compress and tie one bale, and then another, then compress both together and tie them.

My mode of making twin bales has therefore the advantage of saving baling-iron and labor necessary for tying each bale separately— that is, it saves six bands usually used on each of the bales forming a twin bale, and thus six bands only, instead of eighteen, are required for my twin bales. The wedge H, which had been heretofore moved by hand, and which had to be constantly readjusted by hand, is now locked by power by a very simple and easy movement of the hand-lever M'.

The provision made, as at $E^2$, for the attachment of the reversing-cylinders $E^3$ to the caps $E^1$ insures the right position of said parts in relation to the sectors F, and simplifies their adjustment in case of repairs.

It is evident that the rods O and N are applicable to presses of various constructions, and different from the one I have shown. It may also be seen that the wedge H, with its hydraulic cylinder, may be interposed between any upper or lower platen, and its supporting or operating beam; but I have shown the said parts so arranged as to suit a special construction of a press and special demands of purchasers.

What I claim as new, and desire to secure by Letters Patent, is—

1. In a cotton-press the combination of a hydraulic cylinder and a graduating wedge, the cylinder being within the beam above the wedge, substantially as and for the purpose set forth.

2. The wedge H having flanges $h^2$, in combination with the beam C, having rollers $c$ and lugs $c'$, substantially as set forth.

3. The combination of the wedge H, platen J, and the connecting-rod K, having a stationary fulcrum, $k$, substantially as set forth.

4. The mode of compressing and baling twin bales in a press, the said mode consisting in first pressing one bale, retaining the pressure thereof, and then pressing another bale upon the first bale, and applying the bands around the two bales, substantially as and for the purpose described.

5. The combination of the platen F', the rods N, and the rods O, substantially as and for the purpose set forth.

6. The cap-pieces $E^1$ of the frame, having the flanges $E^2$ for supporting the reversing-cylinders $E^3$, and serving as abutments for the sectors, substantially as set forth.

Witness my hand in the matter of my application for patent for an improved cotton-press this 22d day of December, 1876.

SAMUEL H. GILMAN.

Witnesses:
    JAS. A. LAFITTE,
    GEO. RYND.